(12) United States Patent
Lee

(10) Patent No.: US 12,508,105 B2
(45) Date of Patent: Dec. 30, 2025

(54) DATA PROCESSING METHOD AND DATA PROCESSING DEVICE

(71) Applicant: MEDIT CORP., Seoul (KR)

(72) Inventor: Sung Hoon Lee, Seoul (KR)

(73) Assignee: MEDIT CORP., Seoul (KR)

( * ) Notice: Subject to any disclaimer, the term of this patent is extended or adjusted under 35 U.S.C. 154(b) by 306 days.

(21) Appl. No.: 18/034,576

(22) PCT Filed: Oct. 28, 2021

(86) PCT No.: PCT/KR2021/015284
§ 371 (c)(1),
(2) Date: Apr. 28, 2023

(87) PCT Pub. No.: WO2022/092838
PCT Pub. Date: May 5, 2022

(65) Prior Publication Data
US 2023/0380935 A1    Nov. 30, 2023

(30) Foreign Application Priority Data

Oct. 28, 2020  (KR) .......................... 10-2020-0141369
Nov. 6, 2020   (KR) .......................... 10-2020-0148055

(51) Int. Cl.
*A61C 7/00*     (2006.01)

(52) U.S. Cl.
CPC ........ *A61C 7/002* (2013.01); *A61C 2007/004* (2013.01)

(58) Field of Classification Search
CPC .............. A61C 7/002; A61C 2007/004; A61B 2576/02; A61B 5/0062; A61B 5/0088; A61B 5/1111; A61B 5/1128
(Continued)

(56) References Cited

U.S. PATENT DOCUMENTS

| 5,431,562 A   * | 7/1995 | Andreiko .................. A61C 7/00 |
|                 |        | 433/24                               |
| 2005/0043837 A1* | 2/2005 | Rubbert .................... A61C 7/00 |
|                 |        | 700/118                              |

(Continued)

FOREIGN PATENT DOCUMENTS

| JP | 6751712 B2   | 9/2020 |
| KR | 10-0583183 B1 | 5/2006 |

(Continued)

OTHER PUBLICATIONS

Choi Kyoo Ok Apparatus and method for set up a tooth calibration model using oral scan information Jan. 3, 2020 OSSTEM Implant Co Ltd [KR] KR20200000738 (A) paragraphs [0033], [0035], [0048], [0059], [0065], [0085]-[0089], and [0114], and figures 8 and 9 English.*

(Continued)

*Primary Examiner* — Prabodh M Dharia
(74) *Attorney, Agent, or Firm* — Sughrue Mion, PLLC

(57) ABSTRACT

The present disclosure relates to a data processing method and a data processing device. The data processing method, according to the present disclosure, comprises: generating, based on tooth data, a first arch line which is a spline curve in contact with contours of a plurality of teeth constituting the tooth data; generating, from the first arch line, a second arch line that is different from the first arch line; and moving a target tooth, which is to be moved, among the tooth data toward the second arch line according to an input signal of a user.

17 Claims, 15 Drawing Sheets

(58) Field of Classification Search
USPC ....... 345/418; 433/24, 213; 434/24; 700/118
See application file for complete search history.

(56) References Cited

U.S. PATENT DOCUMENTS

| | | | |
|---|---|---|---|
| 2006/0263741 A1* | 11/2006 | Imgrund | A61C 7/00 433/213 |
| 2008/0057461 A1* | 3/2008 | Cheng | A61C 7/00 433/24 |
| 2010/0223034 A1 | 9/2010 | Imgrund et al. | |
| 2015/0238280 A1 | 8/2015 | Wu et al. | |
| 2016/0242880 A1 | 8/2016 | Nikolskiy et al. | |
| 2017/0348071 A1 | 12/2017 | Jin | |
| 2019/0102880 A1* | 4/2019 | Parpara | A61C 7/08 |
| 2021/0259808 A1* | 8/2021 | Ben-Gal Nguyen | G06N 3/088 |

FOREIGN PATENT DOCUMENTS

| | | |
|---|---|---|
| KR | 10-1850599 B1 | 4/2018 |
| KR | 10-2020-0005844 A | 1/2020 |
| KR | 10-2020-0008403 A | 1/2020 |
| KR | 10-2073478 B1 | 2/2020 |
| KR | 10-2161438 B1 | 10/2020 |

OTHER PUBLICATIONS

Choi Kyoo Ok Apparatus and method for set up a tooth calibration model using oral scan information Jan. 3, 2020 OSSTEM Implant Co Ltd [KR] KR20200000738 (A) paragraphs [0033], [0035], [0048], [0059], [0065], [0085]-[0089], and [0114], and figures 8 and 9 Korian.*
Cha Kyung Suk Method for Providing Processing Data for Straightening Teeth Aug. 24, 2005 Cha Kyung Suk KR20050082526 (A) see paragraphs [0034], [0027], [0042], and [0058] English.*
Cha Kyung Suk Method for Providing Processing Data for Straightening Teeth Aug. 24, 2005 Cha Kyung Suk KR20050082526 (A) see paragraphs [0034], [0027], [0042], and [0058] Korian.*
Korean Office Action issued Mar. 23, 2022 in App. No. 10-2020-0148055.
International Search Report for PCT/KR2021/015284 dated Feb. 3, 2022.
Extended European Search Report dated Sep. 9, 2024, issued in European Application No. 21886832.1.

* cited by examiner

DATA PROCESSING METHOD AND DATA PROCESSING DEVICE

CROSS REFERENCE TO RELATED APPLICATIONS

This application is a National Stage of International Application No. PCT/KR2021/015284 filed Oct. 28, 2021, claiming priority based on Korean Patent Application No. 10-2020-0141369 filed Oct. 28, 2020 and Korean Patent Application No. 10-2020-0148055 filed Nov. 6, 2020, the entire disclosures of which are incorporated herein by reference.

TECHNICAL FIELD

The present disclosure relates to a data processing method and a data processing device using the same and, more specifically, to a method and a device for processing tooth data to correspond to a change in a predetermined condition.

BACKGROUND

In an orthodontic plan, conventionally, an impression of a patient's oral cavity was taken to obtain a plaster cast, and then a prosthetic treatment product was manufactured to match the plaster cast and provided to the patient. Errors that occur when manufacturing a plaster cast make it difficult to provide a precise prosthetic treatment product to the patient, and in order to solve this problem, methods for obtaining oral cavity information as data have been continuously researched and developed.

With the development of 3D scanning technology, it is possible to acquire three-dimensional surface model data by scanning the inside of the oral cavity including the patient's teeth, gingiva, and dental arch. The acquired three-dimensional surface model data enables a dentist to virtually perform various active activities such as applying prosthetic treatment products, simulating orthodontic plans, determining carious teeth, and determining whether or not to occlude.

Meanwhile, for three-dimensional surface model data, in establishing a treatment plan and the like through the acquired data, there is a need to modify an already presented treatment plan. At this time, a method for establishing an individualized treatment plan that meets the need of a user and/or a patient by changing an arch line generated based on tooth data among the acquired data is being studied.

SUMMARY

An aspect of the present disclosure is to provide a data processing method for aligning tooth data by using a second arch line having a different form from a pre-generated first arch line, and a device using the same.

The technical tasks of the present disclosure are not limited to the above-mentioned technical task, and other technical tasks not described will be clearly understood by those skilled in the art from the description below.

In order to achieve the above aspect, a data processing method according to the present disclosure comprises generating, based on tooth data, a first arch line which is a spline curve tangent to contours of multiple teeth constituting the tooth data, generating a second arch line different from the first arch line from the first arch line, and moving a target tooth, which is to be moved, among the tooth data toward the second arch line according to a user's input signal.

In addition, the first arch line comprises at least one of an arch line center point formed between central teeth and at least two movement points formed at both sides of the arch line center point, and wherein the second arch line is generated by at least one of parallel movement of the first arch line by the arch line center point and shape deformation by the movement point.

The shape deformation is at least one of a width change of the first arch line according to movement of the movement point on a plane and a smile line change of the first arch line according to movement of the movement point in a normal direction of the plane.

In addition, the moving the target tooth comprises moving the target tooth, which is to be moved, among the tooth data in at least one direction of a buccal direction and a mesial direction determined from the tooth data, and wherein a buccal direction toward the first arch line is identical to a buccal direction toward the second arch line, or a mesial direction toward the first arch line is identical to a mesial direction toward the second arch line.

In addition, the moving the target tooth comprises: generating at least one virtual line passing through a target tooth, which is to be moved, among the tooth data and the second arch line, determining a shortest distance between the target tooth and the second arch line based on the at least one virtual line, and moving the target tooth toward the second arch line side direction.

In addition, wherein the generating the virtual line comprises generating a virtual circle using the target tooth and at least one adjacent tooth adjacent to the target tooth, and generating at least one buccal virtual line parallel to a central virtual line including the central virtual line connecting a center of the circle to a center point of the target tooth, wherein the adjacent tooth comprises a first adjacent tooth formed at one side of the target tooth and a second adjacent tooth formed at the other side of the target tooth.

In addition, the generating the virtual line comprises generating a virtual circle using the target tooth, a primary adjacent tooth adjacent to the target tooth, and a secondary adjacent tooth adjacent to the primary adjacent tooth and spaced apart from the target tooth, and generating at least one buccal virtual line parallel to the central virtual line including a central virtual line connecting a center of the circle to a center point of the target tooth.

In addition, the generating the virtual line comprises generating a virtual circle using the target tooth, an adjacent tooth adjacent to the target tooth, and a virtual adjacent tooth which is adjacent to the target tooth and formed to be symmetrical to the adjacent tooth with respect to the target tooth, and generating at least one buccal virtual line parallel to the central virtual line, including central virtual line connecting a center of the circle to a center point of the target tooth.

In addition, the determining the shortest distance determines a virtual line, among the generated virtual lines, connecting a contour of the target tooth to the second arch line and having a shortest distance, and wherein moving the target tooth toward the second arch line side direction comprises moving the target tooth parallelly in the buccal direction along the determined virtual line.

In addition wherein moving the target tooth toward the second arch line side direction comprises moving the target tooth parallelly in a mesial direction perpendicular to the buccal direction, wherein the parallel movement in the buccal direction is sequentially performed with the parallel movement in the mesial direction, and wherein at least part of teeth included in the tooth data have different buccal directions and different mesial directions.

In addition, the moving the target tooth comprises sequentially performed according to a distance from an arch line center point formed between central teeth of the second arch line to each of tooth data.

A data processing device according to the present disclosure may include a data storage unit configured to store arch line data and tooth data, a controller configured to load and process the data stored in the data storage unit, and a display unit configured to display a process or a result of the processing of the controller, wherein the processing rearranges the tooth data along a second arch line different from a pre-stored first arch line.

In addition, the controller may include an arch line generator configured to generate the second arch line, a virtual figure generator configured to generate at least one virtual line connecting a target tooth, which is to be moved, among the tooth data to the second arch line in order to rearrange the tooth data on the second arch line, a distance calculator configured to determine a shortest distance between the target tooth and the second arch line by the at least one virtual line, and a data adjustment unit configured to move the target tooth toward the second arch line.

In addition, the virtual figure generator is configured to: generate a virtual circle by using the target tooth and at least one adjacent tooth adjacent to the target tooth, and generate at least one buccal virtual line parallel to the central virtual line including a central virtual line connecting a center of the circle to a center point of the target tooth.

In addition, the distance calculator may be configured to determine a virtual line, which has a shortest distance between a contour of the target tooth and the second arch line, from the central virtual line and the at least one buccal virtual line parallel to the central virtual line, and the data adjustment unit may be configured to parallelly move the target tooth in the buccal direction along the determined virtual line.

In addition, the data adjustment unit may be configured to parallelly move the target tooth in a mesial direction perpendicular to the buccal direction, and the parallel movement in the buccal direction may be sequentially performed with the parallel movement in the mesial direction.

In addition, the data adjustment unit may be configured to move a target tooth, which is to be moved, among the tooth data in a buccal direction toward the second arch line, and a buccal direction of the target tooth toward the first arch line may be identical to the buccal direction of the target tooth toward the second arch line.

In addition, the data adjustment unit may be configured to move the target tooth in a mesial direction perpendicular to the buccal direction, and a mesial direction of the target tooth toward the first arch line may be identical to a mesial direction of the target tooth toward the second arch line.

In addition, the first arch line comprises at least one of an arch line center point formed between central teeth, and at least two movement points formed at both sides of the arch line center point, wherein the second arch line is generated by at least one of parallel movement of the first arch line by the arch line center point or shape deformation by the movement point, and wherein the arch line generator is configured to generate a curve, which is finally generated as the second arch line, by parallel movement of the arch line center point or shape deformation by the movement point.

The shape deformation may be at least one of a width change of the first arch line according to movement of the movement point on a plane and a smile line change of the first arch line according to movement of the movement point in a normal direction of the plane.

According to the present disclosure, there is an advantage in that a customized treatment plan may be obtained because a second arch line having a shape different from a previously generated first arch line is generated and tooth data is rearranged.

In addition, there is an advantage in that when the tooth data is rearranged along the second arch line, the tooth data is parallelly moved in the buccal and mesial directions, and thus data processing calculation is easy.

In addition, there is an advantage in that since teeth have different buccal directions and different mesial directions, the tooth data may be precisely rearranged along the curve of the second arch line.

DESCRIPTION OF SYMBOLS

Figure 1:
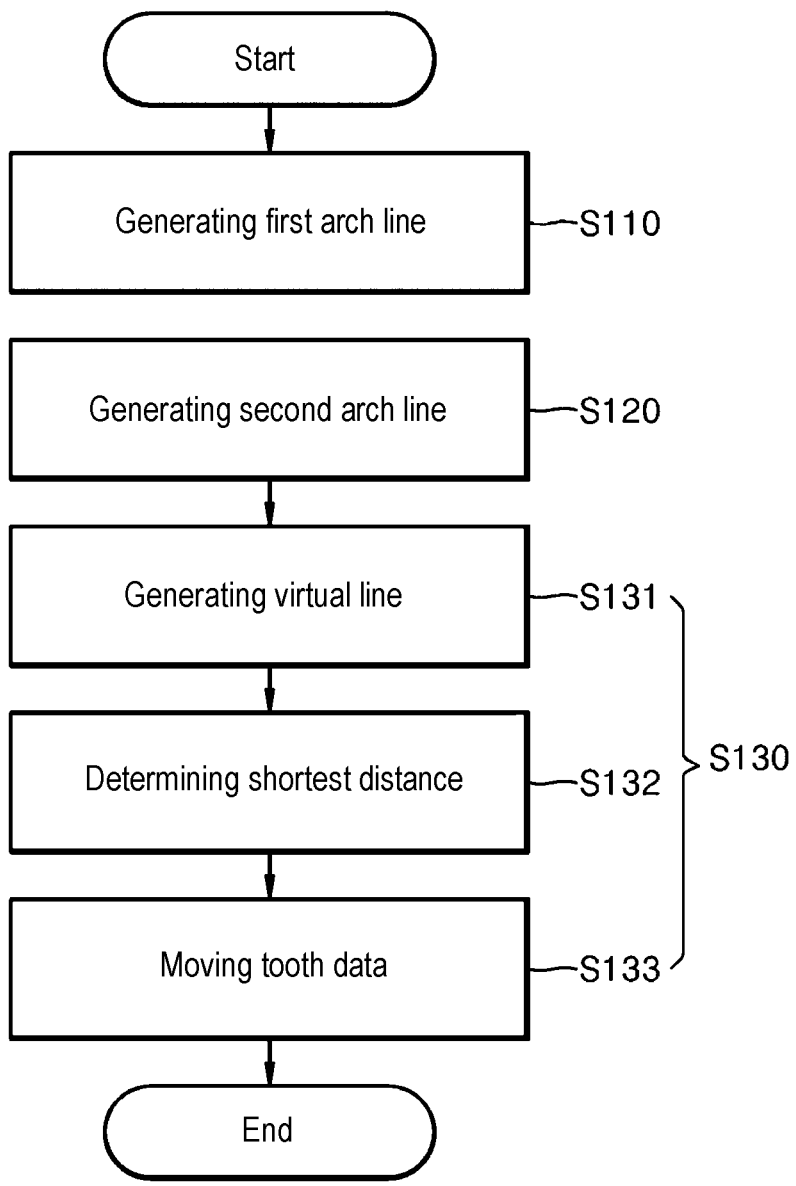
FIG. 1 is a schematic flowchart of a data processing method according to the present disclosure.

| | |
|---|---|
| S110: Step of generating first arch line | S120: Step of generating second arch line |
| S130: Movement step | S131: Virtual line generation step |
| S132: Shortest distance determination step | S133: Tooth data movement step |
| 100: First arch line | 101: Arch line center point |
| 102: Middle line | 103, 104: Movement point |
| 200: Second arch line | 201: Arch line center point |
| 202: Middle line | 203, 204: Movement point |
| 301: 1st tooth | 302: 2nd tooth |
| 303: 3rd tooth | 307: 7th tooth |
| 308: 8th tooth | 400: Predetermined tooth |
| 410: Contour | 410C: Center point |
| 420: Boundary box | L1, L2, L3, L4, L5, L6, L7: Virtual line |
| C, C' : Center of circle | P1: Point on arch line |

P2: Contour point of target tooth
700: Data storage unit
810: Arch line generator
830: Distance calculator
900: Display unit Pa, Pb: Separation point
800: Controller
820: Virtual figure generator
840: Data adjustment unit

DETAILED DESCRIPTION

Hereinafter, some embodiments of the present disclosure will be described in detail with reference to the accompanying drawings. It should be noted that in adding reference numerals to elements in each drawing, the same elements will be designated by the same reference numerals, if possible, although they are shown in different drawings. Furthermore, in the following description of the embodiments of the present disclosure, a detailed description of known functions and configurations incorporated herein will be omitted when it is determined that the description hinders understanding of an embodiment of the present disclosure.

Terms such as first, second, A, B, (a), and (b) may be used when describing elements of the present disclosure. These terms are merely used to distinguish one element from other elements, and a property, an order, a sequence and the like of a corresponding element are not limited by the terms. In addition, all terms used herein, including technical or scientific terms, have meanings that are generally understood by those skilled in the art to which the present disclosure pertains, unless otherwise defined. Such terms as those defined in a generally used dictionary should be interpreted to have the same meanings as the contextual meanings in the relevant field of art, and are not to be interpreted to have ideal or excessively formal meanings unless clearly defined in the present disclosure.

Figure 2:
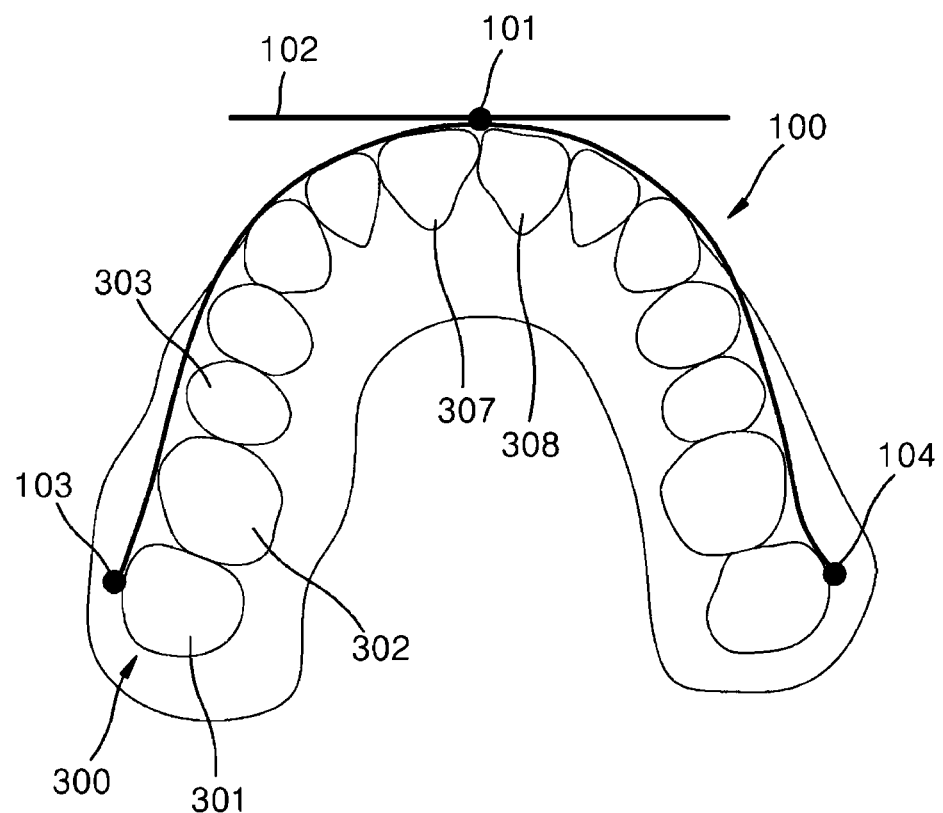
FIGS. 2 to 10 illustrate views for explaining in detail a process of performing a data processing method according to the present disclosure.
Figure 3:
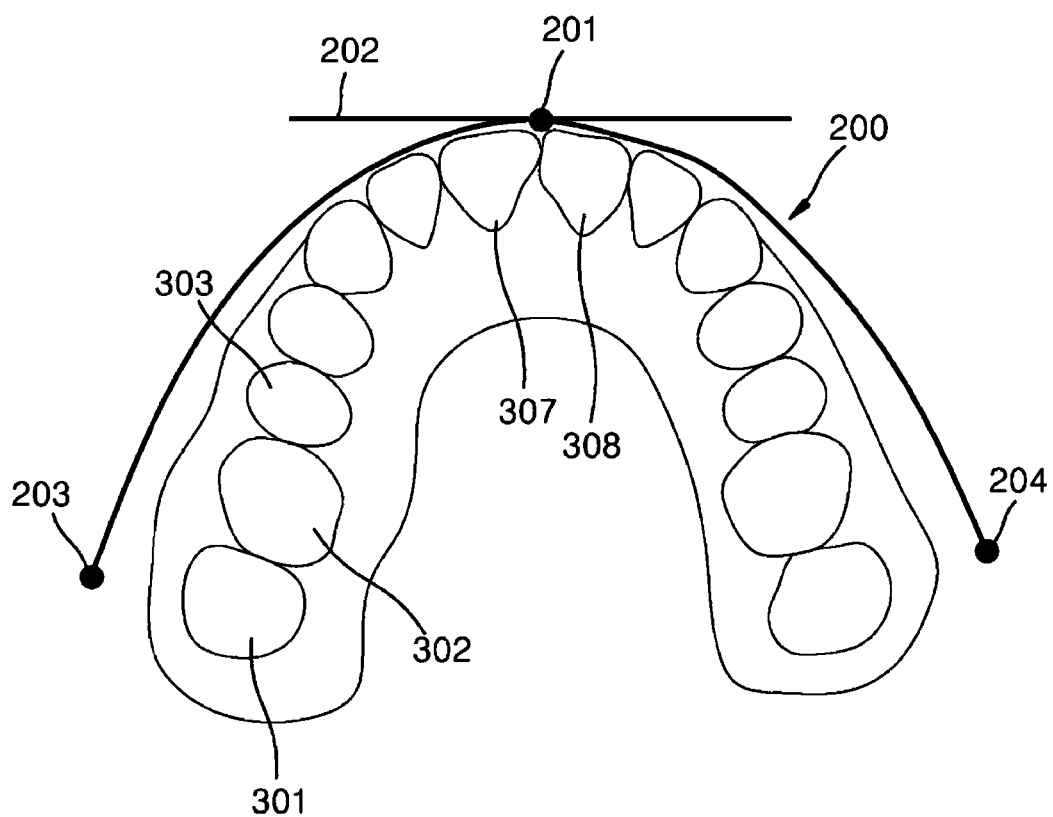

FIG. 1 is a schematic flowchart of a data processing method according to the present disclosure, FIG. 2 shows pre-generated tooth data and a pre-generated first arch line, and FIG. 3 is a view in which a second arch line different from the first arch line is generated.

A data processing method according to the present disclosure may include step S110 of generating a first arch line based on tooth data, step S120 of generating a second arch line different from the first arch line, and step S130 of moving a target tooth, which is to be moved, among the tooth data, toward the second arch line according to a user's input signal.

Referring to FIGS. 1 to 3, before the data processing method according to the present disclosure is applied, oral cavity data including tooth data may be pre-generated to have a first arch line (S110). At this time, the tooth data may be obtained using X-ray, computed tomography (CT), magnetic resonance imaging (MRI), and the like. Also, tooth data may be acquired through a three-dimensional scanner. The three-dimensional scanner may include a table-type scanner and a handheld scanner. The table-type scanner may scan a plaster cast, and the handheld scanner may scan at least one of the plaster cast and a patient's actual oral cavity.

As shown in FIG. 2, a first arch line 100 may be a spline curve that is tangent to the contours of multiple teeth 301, 302, 303, 307, and 308 constituting tooth data 300. The first arch line 100 may be formed through interpolation so as to be tangent to the surfaces of all formed teeth. More specifically, the first arch line 100 tangent to the contour of each of the multiple teeth 301, 302, 303, 307, and 308 may indicate the form of arrangement of the teeth before the teeth are moved and rearranged to correspond to a new arch line (a second arch line) generated later.

In order to describe the present disclosure, data of a group of teeth formed in the upper or lower jaw are shown in the accompanying drawings of the present disclosure. The drawings have 14 teeth. However, the present disclosure is not necessarily limited to the described number and shape of teeth, and the description of the number and shape of teeth should be understood as an exemplary description for smoothly explaining the present disclosure. Hereinafter, for convenience of description, the illustrated teeth are defined as a 1st tooth 301, a 2nd tooth 302, a 3rd tooth 303, a 7th tooth 307 (or a central tooth), an 8th tooth 308 (or a central tooth), etc., and each tooth may be referred to as a target tooth or an adjacent tooth (a first adjacent tooth or a second adjacent tooth, a primary adjacent tooth or secondary adjacent tooth) depending on the situation.

The first arch line 100 may include an arch line center point 101 formed between central teeth 307 and 308 including the 7th tooth 307 and the 8th tooth 308, and a middle line 102 tangent to the arch line center point 101. The arch line center point 101 may be defined as a portion corresponding to the center of the central teeth 307 and 308 in the first arch line 100. When the arch line center point 101 is selected and dragged to another location, the arch line may be parallelly moved as a whole together with the arch line center point 101 and the middle line 102 tangent to the arch line center point 101. When the entire arch line is parallelly moved, a second arch line 200 may be generated at a location to which the entire arch line has been parallelly moved (S120). When the arch line is parallelly moved, the teeth may be moved back and forth, left and right, and rearranged, thereby allowing the teeth and the face to be balanced when matching face data to oral data. As illustrated, when the teeth are formed low relative to the facial data, the middle line 102 may be moved upward to adjust the arch line so that the teeth are formed in a balanced manner as a whole. In addition, when the teeth are biased to one side with respect to the face data, the middle line 102 may be moved to the other side opposite to one side to adjust the arch line so that the teeth are formed in a balanced manner as a whole. In addition, when the teeth are formed to be inclined, the angle of the arch line may be adjusted so that the teeth are arranged in a balanced manner as a whole.

The first arch line 100 may include at least two movement points 103 and 104 formed at both sides of the arch line center point 101. As shown in the drawing, the movement points 103 and 104 may be formed at both ends of the first arch line 100, but the movement points 103 and 104 do not necessarily have to be formed at both ends of the first arch line 100. In addition, one arch line is not limited to having only two movement points. That is, at least two movement points may be formed anywhere within a curve constituting the first arch line 100 at both sides of the arch line center point 101 on the first arch line 100, and the number of movement points may be adjusted according to an allowable range of system resources and the number of reference points required.

Referring to FIG. 3, the second arch line 200 are shown. In practice, the second arch line 200 is a new arch line generated by a deformation of the first arch line 100, and the data processing method according to the present disclosure rearranges the tooth data with respect to the second arch line 200. As illustrated, the second arch line 200 may have a relatively wide curved shape compared with the first arch line 100 by extending the movement points 103 and 104 of the first arch line 100 in the width direction. However, the present disclosure is not necessarily limited thereto, and if necessary, the second arch line 200 may have a relatively narrow curved shape compared with the first arch line 100 by narrowing the movement points 103 and 104 of the first arch line 100 in the width direction. The second arch line 200 may also include an arch line center point 201 formed between the central teeth 307 and 308, and a middle line 202 tangent to the arch line center point 201. As such, the second arch line 200 may be generated in a shape in which the width of the first arch line 100 is changed by moving the movement points 103 and 104 of the first arch line 100 on a plane.

As shown in FIG. 3, in a plan view of teeth viewed from above, the second arch line 200 may be generated by deforming the first arch line 100, but the present disclosure is not limited thereto. That is, the second arch line 200 may be generated in a three-dimensional space in which the oral cavity data is displayed in three dimensions. In this case, the second arch line 200 may be generated by parallel movement of the first arch line 100 on the plane in the three-dimensional space, or by adjusting the movement points 103 and 104 in the width direction. Alternatively, the second arch line 200 may be obtained by adjusting the movement points 103 and 104 of the first arch line 100 in a normal direction perpendicular to the ground in the drawing so that the tooth data as a whole is inclined in the normal direction perpendicular to the ground, and a smile line may be changed accordingly.

The second arch line 200 may be generated by at least one of parallel movement of the first arch line 100 by the arch line center point 101 and shape deformation by the movement points 103 and 104. In other words, the second arch line 200 may be generated by the parallel movement or the shape deformation of the first arch line 100. As described above, only two movement points 103 and 104 are mentioned for convenience of description, but a greater number of movement points may be included in the arch line (the first arch line or the second arch line).

Hereinafter, the step S130 of moving the target tooth toward the second arch line will be described in detail.

FIGS. 2 to 10 illustrate views for explaining in detail a process of performing a data processing method according to the present disclosure.

The movement step S130 may include step S131 of generating at least one virtual line connecting a target tooth, which is to be moved, among tooth data to the second arch line, step S132 of determining the shortest distance between the target tooth and the second arch line by the at least one virtual line, and tooth data movement step S133 of moving the target tooth toward the second arch line.

Before describing the step S131 of generating the virtual line, a method of determining a center point for each tooth including the tooth data will be described.

Figure 4:
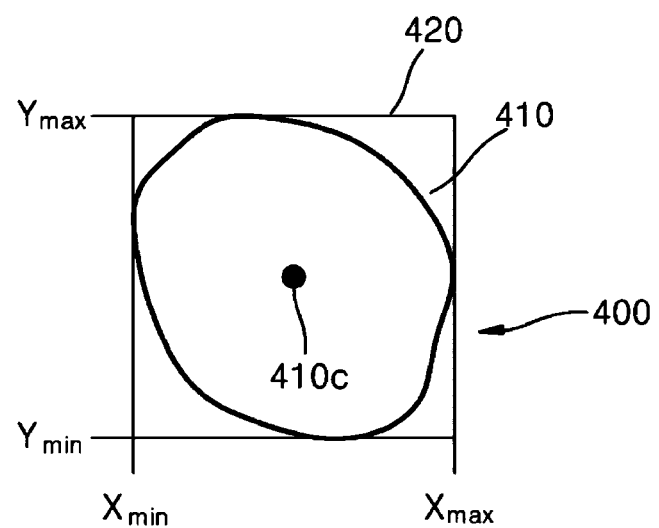

Referring to FIG. 4, a center point of a predetermined tooth 400 may be detected. For example, a contour 410 of the predetermined tooth 400 may be surrounded by a boundary box 420, which is a rectangular box, and a center point 410C of the tooth 400 may be found. The center point 410C may be found by forming triangular mesh points for teeth and analyzing the mesh points. In addition, when the tooth 400 fills most of the boundary box 420, x-axis boundary values Xmin and Xmax and y-axis boundary values Ymin and Ymax of the boundary box 420 may be obtained, and the center of the boundary box 420 may be regarded as the center point 410C of the tooth 400. A virtual line may be generated through the center point 410C of the tooth 400 which has been obtained in this way. This concept of the boundary box 420 may be extended to the concept of a boundary cube in three dimensions, wherein the center of the boundary cube may be projected onto each surface such that the coordinates of the center point in each plane are obtained.

Figure 5:
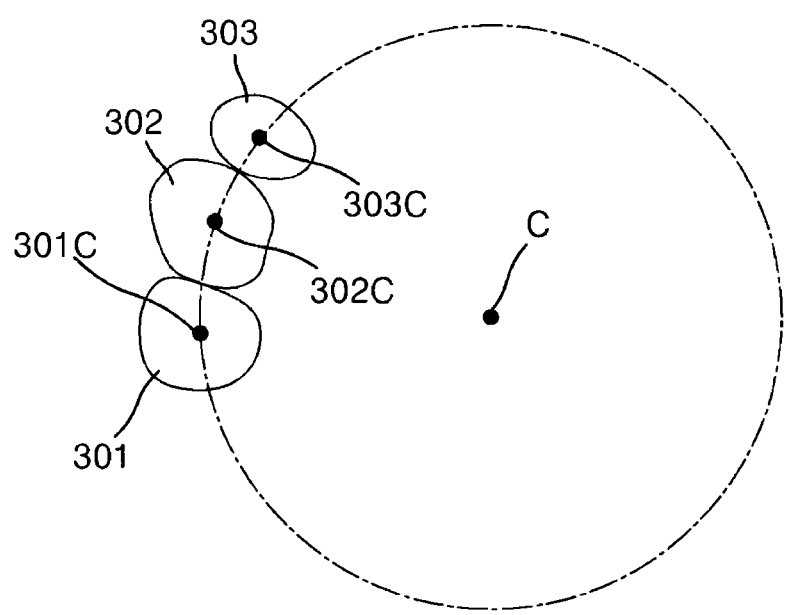
Figure 6:
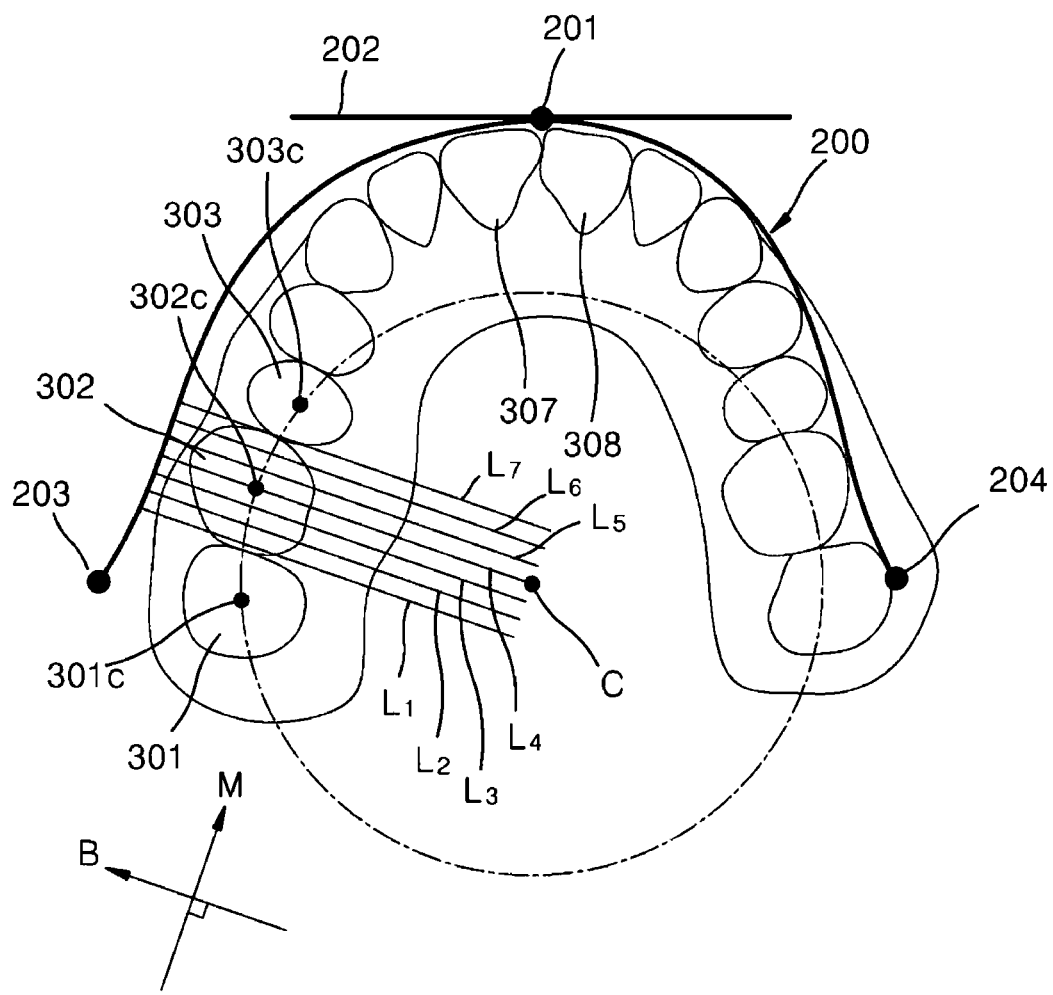
Figure 7:
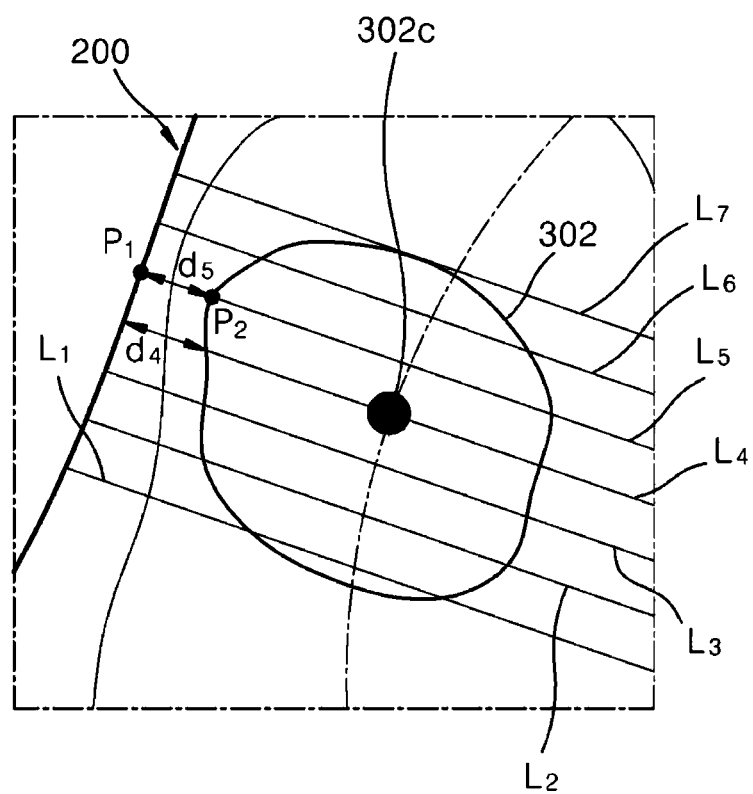

Referring to FIGS. 5 to 7, in the step S131 of generating the virtual line, a virtual circle is generated using a target tooth and at least one adjacent point adjacent to the target tooth, and at least one buccal virtual line parallel to the central virtual line, including a central virtual line connecting the center C of the circle to the center point of the target tooth, may be generated. At this time, the buccal virtual line may be generated by assuming that center points of the tooth data are placed on the same plane, so the target tooth may always have a constant buccal direction even when the smile line is changed by moving the aforementioned movement points in the normal direction perpendicular to the ground.

The step of generating the virtual line using the 1st to 3rd teeth 301 to 303 will be described. For example, when the 2nd tooth 302 is a target tooth that is subject to tooth movement, in the step S131 of generating the virtual line, a virtual circle having a center C may be generated using the 2nd tooth 302, which is a target tooth, and the 1st tooth 301 or the 3rd tooth 303, which is at least one adjacent tooth adjacent to the target tooth. In this case, a method for generating the virtual circle may be obtaining a circle having a circumference on which center points 302C and 301C or 302C and 303C of the teeth are located. In practice, in order to obtain a circle having one curvature radius, three points must be located on the circumference of the circle. Therefore, the center point 302C of the 2nd tooth, which is the target tooth, and the center point 301C of the 1st tooth and the center point 303C of the 3rd tooth, which are the adjacent teeth, may be used as reference points to generate the virtual circle.

The step S131 of generating the virtual line will be described with reference to FIG. 6. As described above, when a virtual circle having a center C is generated, a central virtual line connecting the center C of the circle to the center point of a target tooth (i.e., 302C, which is the center point of the 2nd tooth) may be generated. In addition, at least one buccal virtual line parallel to the central virtual line may be additionally generated. As shown in FIG. 6, since the virtual line passing through the center point 302C of the 2nd tooth, which is the target tooth, is L4, L4 may act as the central virtual line. For example, the step S131 of generating the virtual line may include a first virtual line L1, a second virtual line L2, a third virtual line L3, a fourth virtual line L4 (the central virtual line), a fifth virtual line L5, a sixth virtual line L6, and a seventh virtual line L7.

Multiple virtual lines L1, L2, L3, L5, L6, and L7 parallel to the central virtual line L4 may connect the target tooth to the second arch line 200 while having the same direction as the central virtual line L4. At least two virtual lines, including the central virtual line, may be generated, and the number of virtual lines generated may be adjusted as needed. As the number of virtual lines generated increases, the precision of tooth data processing can be improved.

Referring to FIG. 7, in the step S132 of determining the shortest distance, a virtual line connecting the contour of the target tooth to the second arch line 200 and having the shortest distance therebetween may be determined from among the generated virtual lines. In this case, it is noted that a spacing distance d4 of the central virtual line L4 passing through the center point 302C of the 2nd tooth, which is the target tooth, is longer than a spacing distance d5 of the adjacent fifth virtual line L5. That is, a virtual line passing through the central point of a tooth may not always reach the second arch line 200 at the shortest distance compared with other virtual lines. Accordingly, as shown in FIG. 7, the virtual line L5 may be determined to be the virtual line having the shortest distance.

Accordingly, a path enabling a tooth to move the shortest distance may be determined by generating at least two virtual lines including the central virtual line, and this has the advantage of saving system resources and preventing tooth data from overlapping the second arch line 200 when the tooth data is parallelly moved.

Figure 8:
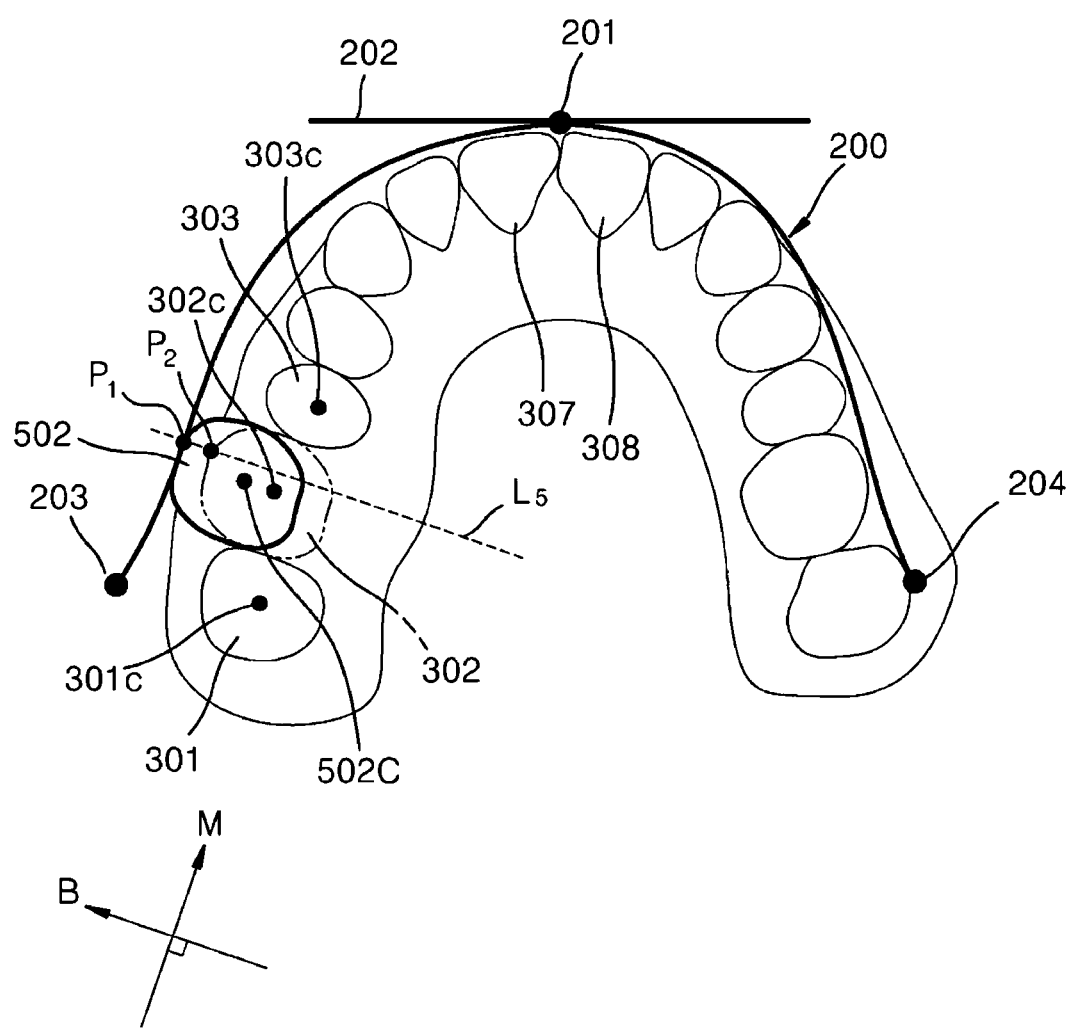

Referring to FIGS. 7 and 8, the tooth data movement step S133 may cause the target tooth to be parallelly moved in a buccal direction along the determined virtual line. The buccal direction may be interpreted as a "cheek direction" in a dictionary sense, but in the present disclosure, the buccal direction may refer to a direction in which a virtual line is formed. That is, the buccal direction is a direction directed by a virtual line extending from the center C of the virtual circle to the center of the target tooth. When the target tooth is parallelly moved in the buccal direction, a contour point P2 of the target tooth, which is the 2nd tooth 302, is parallelly moved in the buccal direction toward the second arch line 200 to match a point P1 of the second arch line 200.

In the movement step S130, a target tooth, which is to be moved, among the tooth data may be moved in at least one direction of a buccal direction and a mesial direction determined from the tooth data. At this time, the buccal direction may be determined from the relationship between centers of the target tooth and adjacent teeth, and thus the buccal direction of the target tooth toward the first arch line may be identical to the buccal direction of the target tooth toward the second arch line. That is, the buccal direction in which the target tooth is moved is constant regardless of the shape of the arch line, and thus the movement of the target tooth may not involve tooth rotation, the calculation speed may be fast, and a more stable treatment model may be obtained.

The positions of the contour point P2 of the target tooth and the point P1 of the second arch line 200 may be changed depending on a changed arch line determined based on the user's input signal. This is because the buccal direction in which the target tooth moves is always the same regardless of the changed arch line. A virtual line, in which the shortest distance is formed between the changed arch line and the target tooth to be moved, may be differently selected depending on the shape of the changed arch line, and even when the same virtual line is selected, the contour of the target tooth may not touch the arch line before the change at the same point (so-called, a marker). Thus, the target tooth may not rotate according to the change of the arch line, and the target tooth does not necessarily match a specific point of the arch line. Accordingly, compared with a method in which a target tooth matches a specific point of the arch line, the calculation speed may be faster and a more stable treatment model may be obtained.

In addition, the data processing method according to the present disclosure is advantageous in that tooth data does not substantially overlap the second arch line 200, and thus a more improved treatment model is provided to the user.

Hereinafter, the step of generating a virtual line according to another embodiment of the present disclosure will be described.

Figure 9:
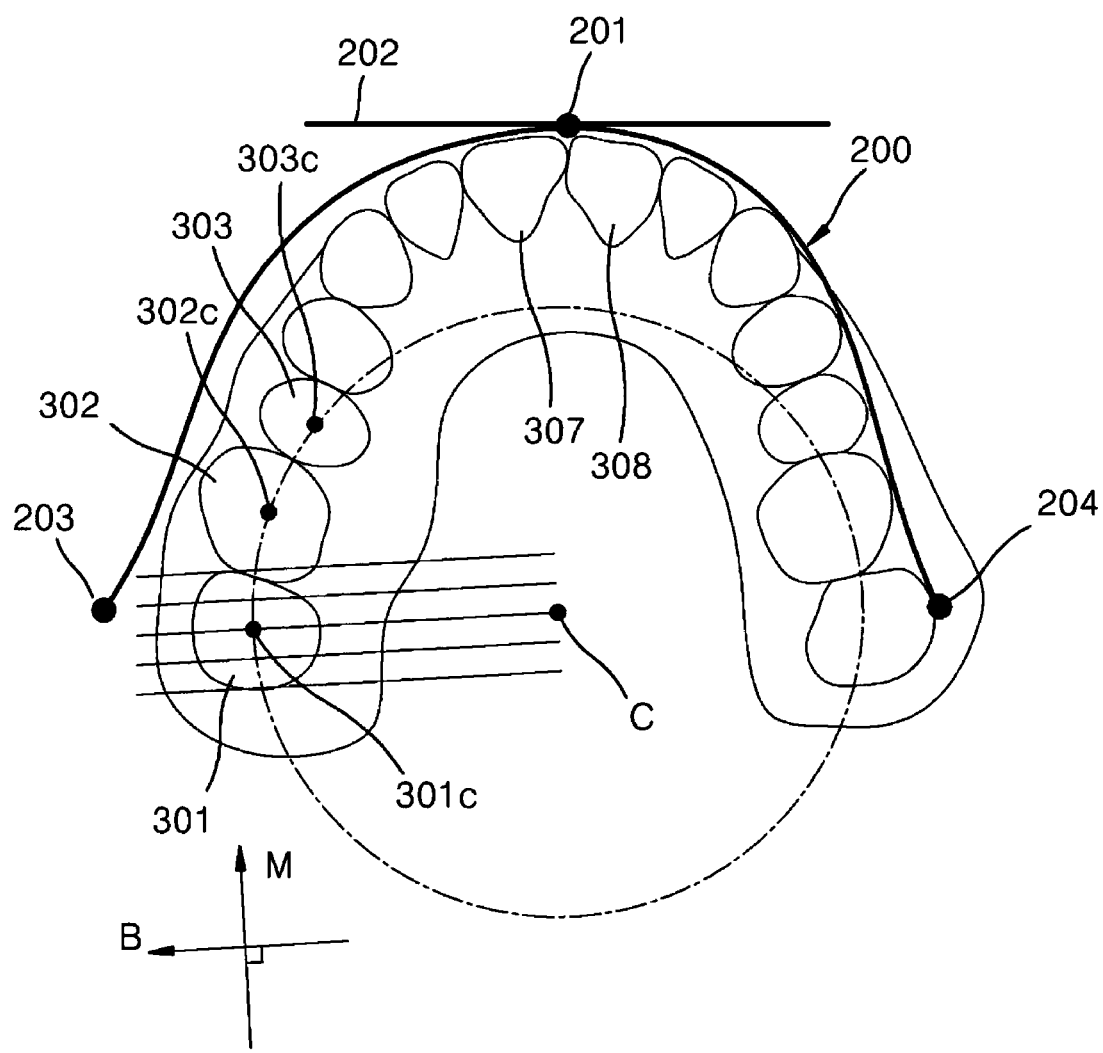

Referring to FIG. 9, it is difficult to form a virtual circle because adjacent teeth are not formed at both sides of the 1st tooth 301 corresponding to the molar tooth. In this case, in the step S131 of generating a virtual line, it is possible to use a method of generating a virtual circle by using a target tooth, a primary adjacent tooth adjacent to the target tooth, and a secondary adjacent tooth adjacent to the primary adjacent tooth and spaced apart from the target tooth. That is, the 1st tooth 301 has only the 2nd tooth 302 as an adjacent tooth, but the 2nd tooth 302 may be regarded as a primary adjacent tooth, the 3rd tooth 303 may be regarded as a secondary adjacent tooth, and a virtual circle including center points 301C, 302C and 303C of the teeth in the circumference thereof may be generated. Therefore, a central virtual line connecting the center 301C of the 1st tooth 301, which is the target tooth, to the center (C) of the virtual circle may be generated, and at least one buccal virtual line parallel to the central virtual line is additionally generated. Hereinafter, the step S132 of determining the shortest distance and the tooth data movement step S133 may be performed in the same manner as described above.

Figure 10:
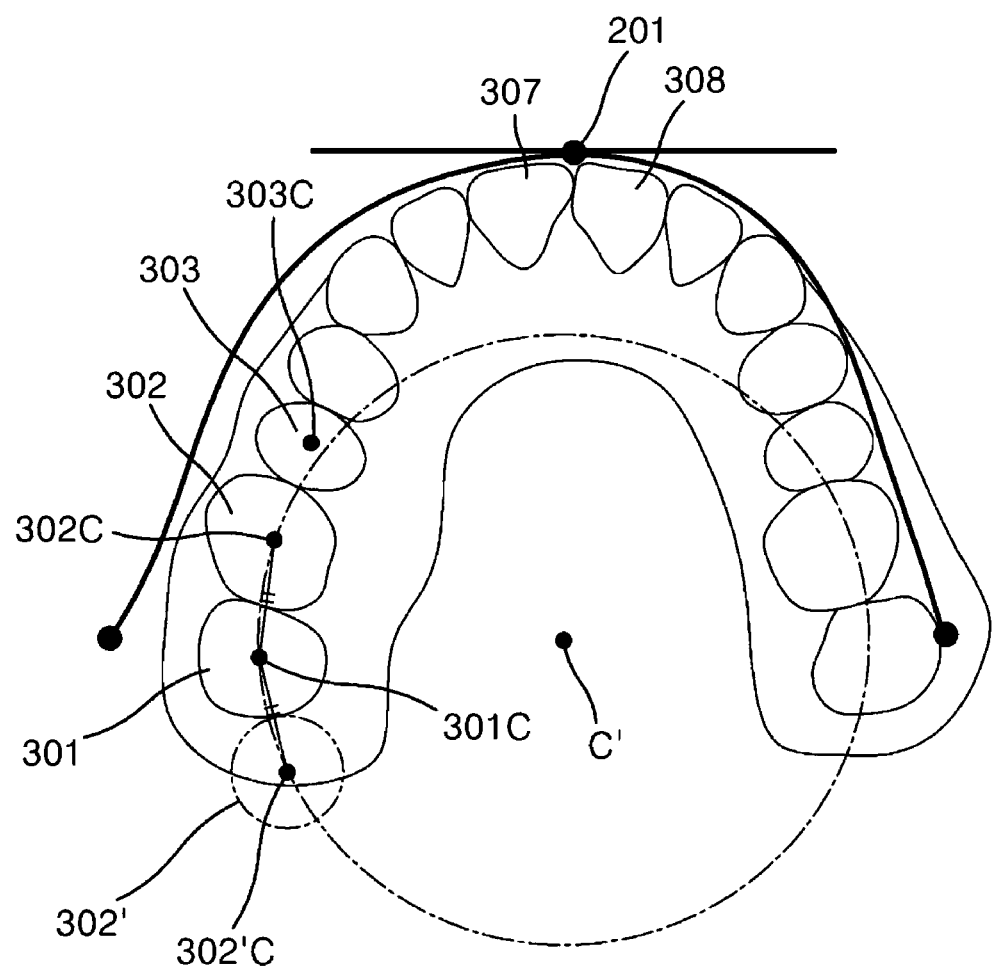

In addition, referring to FIG. 10, another method of forming a virtual circle for the 1st tooth 301 corresponding to the molar tooth when the target tooth is the 1st tooth 301 is proposed. In the step S131 of generating the virtual line, the virtual circle may be generated using a target tooth, adjacent teeth adjacent to the target tooth, and virtual adjacent teeth adjacent to the target tooth and formed to be symmetrical to the adjacent teeth with respect to the target tooth. That is, the 1st tooth 301 has only the 2nd tooth 302 as an adjacent tooth, but a virtual adjacent tooth 302' may be generated at a position symmetrical to that of the 2nd tooth 302 with respect to the 1st tooth 301. Therefore, in this case, a virtual circle is formed through the center point 302'C of the virtual adjacent tooth 302', the center point 301C of the 1st tooth 301 as the target tooth, and the center point 302C of the 2nd tooth 302 as an adjacent tooth. Therefore, a central virtual line may be generated to connect the center C' of the virtual circle and the center 301C of the 1st tooth 301, which is the target tooth, and at least one buccal virtual line parallel to the central virtual line may be additionally generated. Hereinafter, the step S132 of determining the shortest distance and the tooth data movement step S133 may be performed in the same manner as described above.

The above description is made regarding the case where the target tooth corresponds to the molar, but is not necessarily limited thereto. The above description may be equally applied to the case where it is necessary to consider a portion from which a tooth has been extracted or a portion from which a tooth is scheduled to be extracted during orthodontic treatment and analyze that there is no tooth in the portion.

Figure 11:
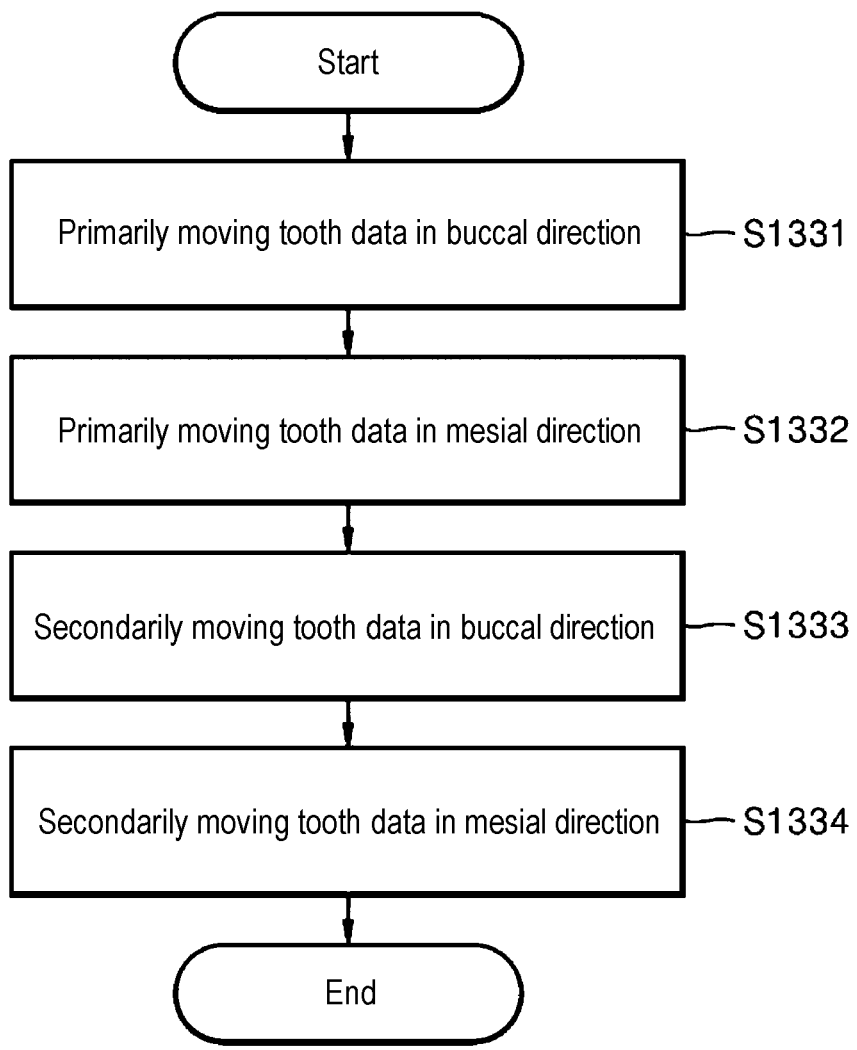
FIG. 11 illustrates a schematic flowchart of an exemplary process of moving tooth data in a data processing method according to the present disclosure.

FIG. 11 illustrates a schematic flowchart of an exemplary process of moving tooth data in a data processing method according to the present disclosure.

Teeth moved in a buccal direction may overlap or be spaced apart from each other depending on the width of the second arch line. However, for orthodontic purposes, all teeth should be regularly arranged without overlapping or being spaced apart. Accordingly, the teeth moved in the buccal direction may be parallelly moved in a direction different from the buccal direction so that the teeth come into contact with each other. More specifically, referring to FIG.

11, in the tooth data movement step S133, the target tooth may be parallelly moved in a mesial direction perpendicular to the buccal direction. The mesial direction may refer to a central direction according to a dictionary meaning, but in the present specification, may be interpreted as a direction perpendicular to the buccal direction defined with respect to the target tooth. The parallel movement in the mesial direction may be sequentially performed following the parallel movement in the buccal direction of the tooth data. By performing the parallel movement in the buccal direction and then the parallel movement in the mesial direction, the tooth data may be placed close to the second arch line 200 and then parallelly moved in the mesial direction. This process is advantageous in that system resources may be saved and a more stable treatment model may be obtained.

As described above, in the movement step S130, a target tooth, which is to be moved, among the tooth data may be moved in at least one direction among the buccal direction and the mesial direction determined from the tooth data. At this time, the mesial direction is formed to be perpendicular to the buccal direction, and thus the mesial direction of the target tooth toward the first arch line may be identical to the mesial direction of the target tooth toward the second arch line. More specifically, the mesial direction of the target tooth is constant regardless of the shape of the arch line. Accordingly, since the target tooth does not rotate when the target tooth is moved in the buccal direction and the mesial direction, rapid calculation may be possible, and a stable treatment model may be obtained.

In addition, in the conventionally disclosed technology in which a marker is made on a tooth and a rearrangement is performed so that a corresponding marker point is tangent to a generated arch line, one fixed point of tooth data had to be moved while inevitably touching the arch line. In contrast, the data processing method according to the present disclosure is advantageous in that a separate marker is not required for tooth data and the degree of freedom is higher because an appropriate part of the contour of a tooth may be tangent to an arch line according to the generation of the arch line.

At least some of teeth included in the tooth data may have different buccal directions and different mesial directions. According to the change of the second arch line 200, the buccal direction and the mesial direction may be differently formed to correspond to positions where the teeth of the tooth data are arranged, and this has the advantage of allowing the tooth data to be more precisely fitted to the arch line.

Figure 12:
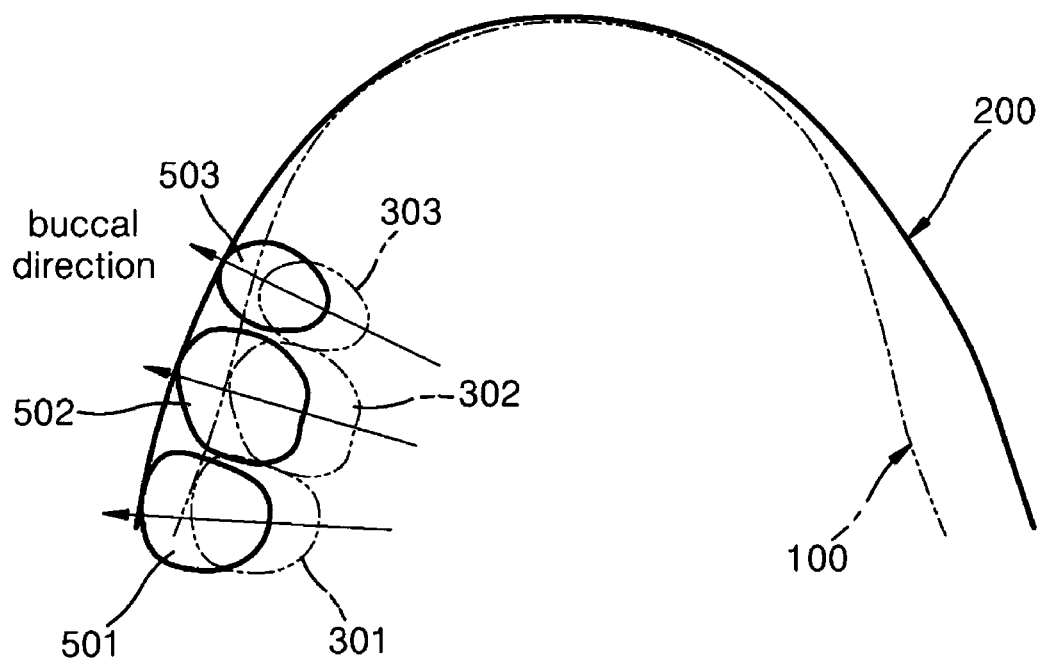
FIG. 12 illustrates tooth data moved in a buccal direction toward a second arch line.
Figure 13:
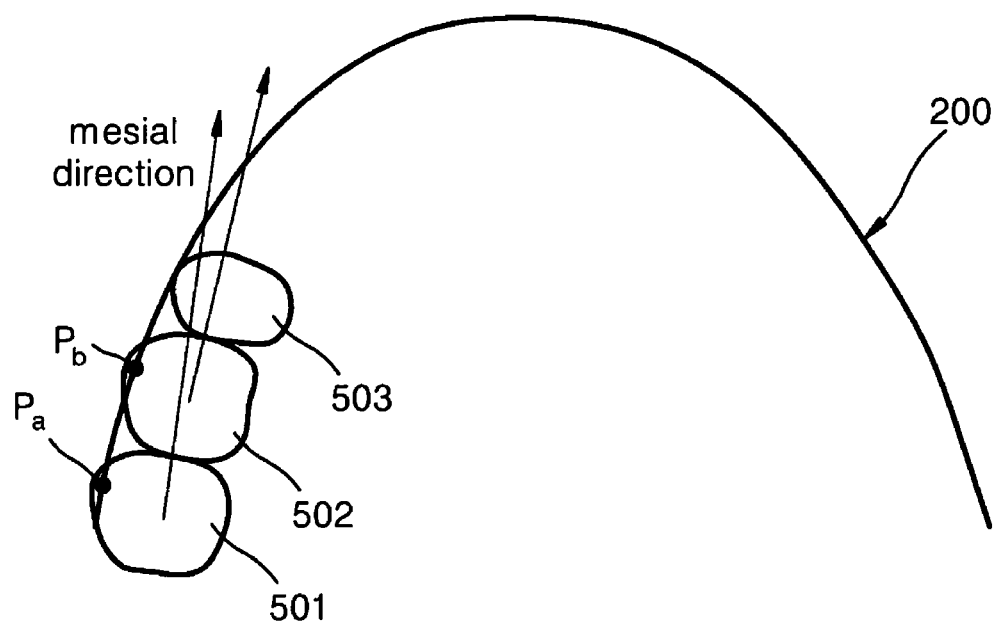
FIG. 13 illustrates tooth data moved in a mesial direction toward a second arch line.

FIG. 12 illustrates tooth data moved in a buccal direction toward the second arch line 200, and FIG. 13 illustrates tooth data moved in a mesial direction toward the second arch line 200.

Referring to FIGS. 11 to 13, when tooth data is parallelly moved in the buccal direction toward the second arch line 200, gaps may be formed between the teeth. For example, a changed 1st tooth 501, a changed 2nd tooth 502, and a changed 3rd tooth 503 were parallelly moved in the buccal direction of the respective teeth, and gaps were formed between the changed teeth 501, 502, and 503. In addition, although not shown in FIG. 12, if the width of the second arch line 200 is narrower than the width of the first arch line 100, the respective teeth may overlap when the tooth data is parallelly moved in the buccal direction toward the second arch line 200. In addition, referring to FIG. 13, when the tooth data is parallelly moved in the mesial direction toward the second arch line 200, at least some of the changed 1st tooth 501, the changed 2nd tooth 502, and the changed 3rd tooth 503 may not be circumscribed to the second arch line 200, and separation points P a and Pb may occur. That is, the tooth data may be separated from the second arch line 200 by the movement in the mesial direction. Accordingly, in the tooth data movement step, the tooth data may be parallelly moved twice or more in the buccal direction and in the mesial direction. For example, as shown in FIG. 11, tooth data may be primarily moved in a buccal direction (S1331), and the tooth data may be primarily moved in a mesial direction (S1332). Subsequently, the tooth data may be secondarily moved in the buccal direction (S1333), and the tooth data may be secondarily moved in the mesial direction (S1334). However, this is exemplary, and parallel movement in the buccal direction and parallel movement in the mesial direction may be performed once. In addition, the parallel movement in the buccal direction and the parallel movement in the mesial direction may be performed three or more times. By performing the movement of the tooth data in the buccal direction and the movement of the tooth data in the mesial direction at least once, the teeth may be regularly arranged so as not to be spaced apart from or overlap each other without separation from the second arch line 200.

The above-described movement step S130 may be sequentially performed depending on the distance from the arch line center point 201 formed between central teeth (e.g., a 7th tooth and an 8th tooth) of the second arch line 200 to each piece of the tooth data. For example, it is assumed that there are 1st to 14th teeth as tooth data, and the arch line center point 201 is formed between the 7th tooth and the 8th tooth. At this time, since the distance from the arch line center point 201 to the center teeth (the 7th tooth and the 8th tooth) is the shortest, the movement step S130 may be performed first with respect to the central teeth. Thereafter, the movement step S130 may be performed with respect to tooth data disposed further outward from the central teeth. In this way, the movement step S130 is sequentially performed depending on the position of the tooth data, so that the tooth data may be rearranged to gather at the arch line center point 201. Accordingly, the tooth data may be rearranged toward the center of the oral cavity, and thus the user may obtain a stable treatment model.

Figure 14:
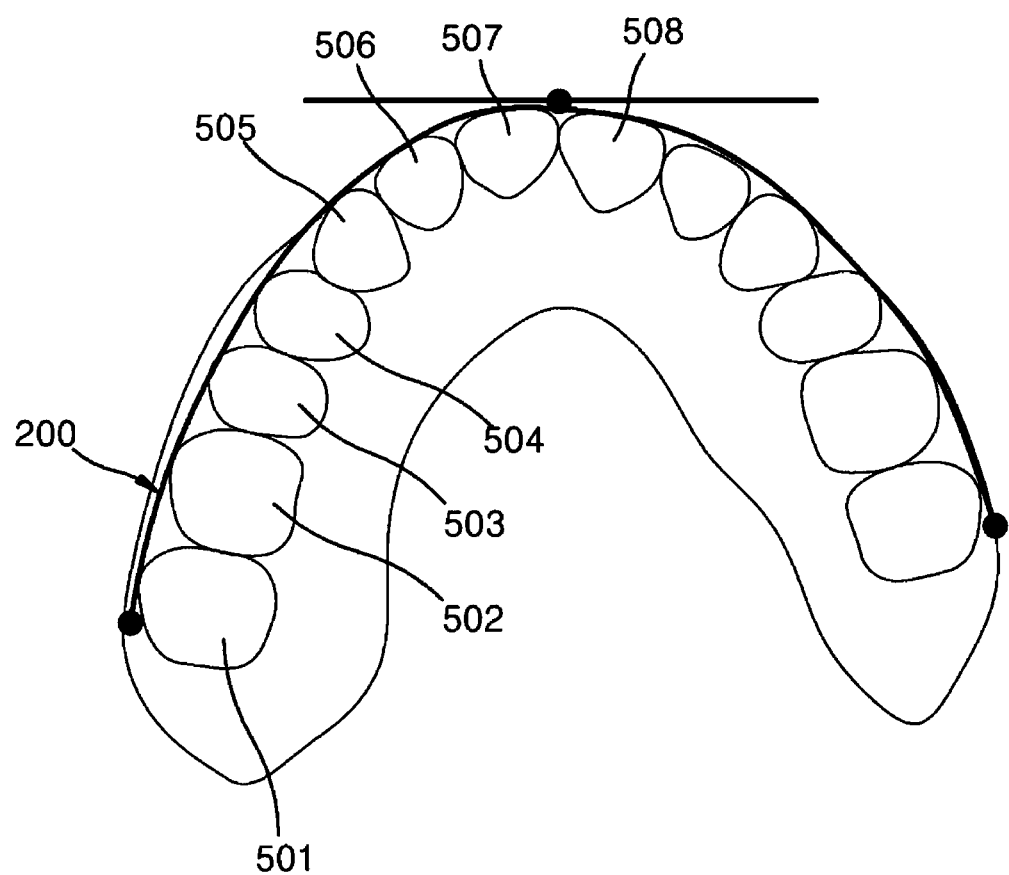
FIG. 14 illustrates tooth data in which data processing has been completed according to a data processing method according to the present disclosure.

FIG. 14 illustrates tooth data in which data processing has been completed according to a data processing method according to the present disclosure. As shown in FIG. 14, a changed 1st tooth 501, a changed 2nd tooth 502, a changed 3rd tooth 503, a changed 4th tooth 504, a changed 5th tooth 505, a changed 6th tooth 506, a changed 7th tooth 507, and a changed 8th tooth 508 are parallelly moved toward the second arch line 200 and rearranged along the second arch line 200. As such, the use of the data processing method according to the present disclosure is advantageous in that tooth data may be rearranged only by parallel movement without rotation, so that the calculation speed of the system may be improved and the user may obtain a precise treatment model.

The rearrangement of the tooth data may be performed after the second arch line 200 is finally changed. More specifically, in the step S110 of generating the second arch line, a curve finally determined by changing the center point or movement point of the first arch line may be generated as the second arch line. In general, the user completes the second arch line by changing the center point or movement point of the first arch line several times. Rearranging the teeth whenever the center point or movement point is changed may waste computational resources and may confuse the user. Therefore, a separate icon may be provided on a user interface (UI) and the above-described movement method may be performed according to the user's input signal so that all teeth are parallelly moved toward the second arch line and rearranged.

Hereinafter, a data processing device for performing the data processing method according to the present disclosure will be described. In describing the data processing device, a description overlapping with the above description will be briefly made or omitted.

Figure 15:
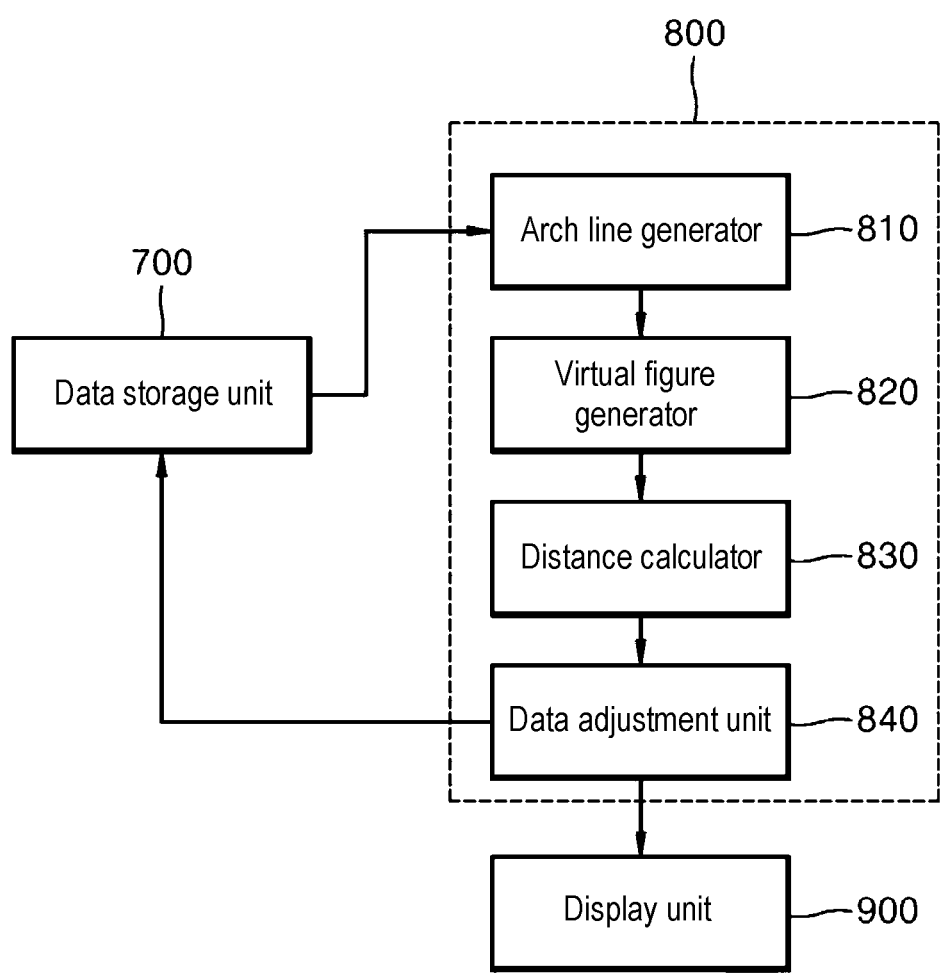
FIG. 15 schematically illustrates a configuration of a data processing device for performing a data processing method according to the present disclosure.

FIG. 15 schematically illustrates a configuration of a data processing device for performing the data processing method according to the present disclosure.

Referring to FIG. 15, the data processing device for performing the data processing method according to the present disclosure may include a data storage unit 700, a controller 800, and a display unit 900.

The data storage unit 700 stores objects on which calculations of the controller 800 are performed, and may have the aforementioned arch line data (the first arch line and the second arch line), tooth data information (the position, color, tooth center point, or the like of tooth data) and the like. Data newly generated after the calculation of the controller 800 is performed may also be stored in the data storage unit 700.

The controller 800 may load and process data stored in the data storage unit 700. More specifically, loading and processing the data may be to rearrange tooth data along a second arch line different from a pre-stored first arch line.

Hereinafter, a detailed configuration of the controller 800 will be described.

The controller 800 may include an arch line generator 810 for generating a second arch line different from a first arch line. The second arch line may be generated in practice by adjusting an arch line center point of the first arch line or at least one of movement points formed at both sides of the arch line center point. More specifically, the second arch line may be generated by at least one of parallel movement of the first arch line by the arch line center point or shape deformation by the movement point. In this case, the shape deformation may be a change in the width of the first arch line according to the movement of the movement point on a plane, or a change in the smile line of the first arch line according to the movement of the movement point in the normal direction of the plane. According to the second arch line created in this way, tooth data may be adjusted to match the second arch line.

The parallel movement of the first arch line by the arch line central point or the shape deformation by the movement point may be performed multiple times to provide a treatment model suitable for a user. Accordingly, the arch line generator 810 may generate, as the second arch line, a curve finally generated by the parallel movement of the first arch line by the arch line center point or the shape deformation by the movement point. Tooth data to be described later may be rearranged by the generated second arch line.

Meanwhile, in order to rearrange the tooth data on the generated second arch line, the controller 800 may include a virtual figure generator 820 which generates at least one virtual line connecting to a second arch line and a target tooth, which is to be moved, among the tooth data. Here, a virtual figure may refer to a figure that is not actually displayed in the form of a model on tooth data. More specifically, the virtual figure may be a virtual line connecting the target tooth to the second arch line, or may be a virtual circle that is to be used as a reference to generate a virtual line.

In order to generate a virtual line, the virtual figure generator 820 first uses a target tooth to be moved and center points of at least one adjacent tooth adjacent to the target tooth to obtain a virtual circle with a circumference including the center points. Preferably, there may be at least two adjacent teeth. The virtual figure generator 820 may generate a central virtual line formed in a buccal direction by connecting the center of the circle to the center of the target tooth. In addition, the virtual figure generator 820 may additionally generate at least one buccal virtual line parallel to the central virtual line. At least two virtual lines may be generated, including the central virtual line and the buccal virtual line parallel to the central virtual line. The process of obtaining the virtual circle and the process of generating the virtual line are as described above in the data processing method according to the present disclosure.

The controller 800 may include a distance calculator 830 which determines the shortest distance between the target tooth and the second arch line by at least one virtual line. More specifically, the distance calculator 830 may determine a virtual line, having the shortest distance from the contour of the target tooth to the second arch line, from among the central virtual line and the at least one buccal virtual line parallel to the central virtual line. That is, a virtual line, among multiple virtual lines, which has the shortest distance among distances between points of the second arch line and points of tooth contours, through which the multiple virtual lines pass, respectively, is determined as a virtual line for tooth movement.

In addition, the controller 800 may include a data adjustment unit 840 for moving the target tooth toward the second arch line. The data adjustment unit 840 parallelly moves the target tooth in the buccal direction along the virtual line determined by the distance calculator 830. Therefore, the target tooth may be rearranged to touch the second arch line, and the user can obtain a customized treatment model.

The data adjustment unit 840 may also parallelly move the target tooth in a mesial direction perpendicular to the buccal direction. As the target tooth, which has moved only in the buccal direction, is parallelly moved in the mesial direction, teeth may be formed to be adjacent along the arch line without being spaced apart from each other. The data adjustment unit 840 may sequentially perform the parallel movement in the buccal direction and the parallel movement in the mesial direction, and teeth included in the tooth data may be precisely rearranged through the parallel movement without rotation. The contents described in relation to the data processing device according to the present disclosure, such as the movement of the target tooth, are the same as those described in relation to the data processing method according to the present disclosure.

The display unit 900 may display the processing process or processing result of the controller 800 described above. A known visual display device may be used as the display unit 900. For example, the display unit 900 may be any one of a monitor, a tablet, and a touch panel. However, the present disclosure is not limited to the presented examples, and any means capable of visually displaying a data processing process or a data processing result to a user and/or patient may be used.

The above description has been made merely for the purpose of illustrating the technical idea of the present disclosure, and those skilled in the art to which the present disclosure belongs may make various modifications and changes without departing from the essential characteristics of the present disclosure.

Therefore, the embodiments disclosed in the present disclosure are not intended to limit the technical idea of the present disclosure but to explain, and the scope of the technical idea of the present disclosure is not limited by these embodiments. The scope of the present disclosure should be construed on the basis of the accompanying claims in such a manner that all of the technical ideas included in the scope equivalent to the claims belong to the present disclosure.

INDUSTRIAL APPLICABILITY

An aspect of the present disclosure is to provide a data processing method and data processing device that provide a user and/or patient with an individualized treatment plan by parallelly moving tooth data to a second arch line different from a first arch line.

What is claimed is:

1. A data processing method comprising:
    generating, based on tooth data, a first arch line which is a spline curve tangent to contours of multiple teeth constituting the tooth data;
    generating a second arch line different from the first arch line from the first arch line, and
    moving a target tooth, which is to be moved, among the tooth data toward the second arch line according to a user's input signal,
    wherein the moving the target tooth comprises moving the target tooth, which is to be moved, among the tooth data in at least one direction of a buccal direction or a mesial direction determined from the tooth data, and
    wherein:
    a first buccal direction of the target tooth toward the first arch line is identical to a second buccal direction of the target tooth toward the second arch line, or
    a first mesial direction of the target tooth toward the first arch line is identical to a second mesial direction of the target tooth toward the second arch line.

2. The data processing method of claim 1, wherein the first arch line comprises at least one of an arch line center point formed between central teeth and at least two movement points formed at both sides of the arch line center point, and
    wherein the second arch line is generated by at least one of parallel movement of the first arch line by the arch line center point and shape deformation by the movement point.

3. The data processing method of claim 2, wherein the shape deformation is at least one of a width change of the first arch line according to movement of the movement point on a plane and a smile line change of the first arch line according to movement of the movement point in a normal direction of the plane.

4. The data processing method of claim 2, wherein the moving the target tooth comprises sequentially moving the target tooth and other teeth according to a distance from an arch line center point formed between central teeth of the second arch line to each of tooth data.

5. The data processing method of claim 1, wherein the moving the target tooth comprises:
    generating at least one virtual line passing through the target tooth, which is to be moved, among the tooth data and the second arch line;
    determining a shortest distance between the target tooth and the second arch line based on the at least one virtual line; and
    moving the target tooth toward the second arch line side direction.

6. The data processing method of claim 5, wherein the generating the virtual line comprises generating a virtual circle using the target tooth and at least one adjacent tooth adjacent to the target tooth, and generating at least one buccal virtual line parallel to a central virtual line including the central virtual line connecting a center of the circle to a center point of the target tooth, wherein the adjacent tooth comprises a first adjacent tooth formed at one side of the target tooth and a second adjacent tooth formed at the other side of the target tooth.

7. The data processing method of claim 6, wherein the determining the shortest distance determines a virtual line, among the generated virtual lines, connecting a contour of the target tooth to the second arch line and having a shortest distance, and
    wherein moving the target tooth toward the second arch line side direction comprises moving the target tooth parallelly in the buccal direction along the determined virtual line.

8. The data processing method of claim 7, wherein moving the target tooth toward the second arch line side direction comprises moving the target tooth parallelly in a mesial direction perpendicular to the buccal direction,
    wherein the parallel movement in the buccal direction is sequentially performed with the parallel movement in the mesial direction, and
    wherein at least part of teeth included in the tooth data have different buccal directions and different mesial directions.

9. The data processing method of claim 5, wherein the generating the virtual line comprises generating a virtual circle using the target tooth, a primary adjacent tooth adjacent to the target tooth, and a secondary adjacent tooth adjacent to the primary adjacent tooth and spaced apart from the target tooth, and generating at least one buccal virtual line parallel to the central virtual line including a central virtual line connecting a center of the circle to a center point of the target tooth.

10. The data processing method of claim 5, wherein the generating the virtual line comprises generating a virtual circle using the target tooth, an adjacent tooth adjacent to the target tooth, and a virtual adjacent tooth which is adjacent to the target tooth and formed to be symmetrical to the adjacent tooth with respect to the target tooth, and generating at least one buccal virtual line parallel to the central virtual line, including central virtual line connecting a center of the circle to a center point of the target tooth.

11. A data processing device comprising:
    a data storage unit configured to store arch line data and tooth data;
    a controller configured to load and process the data stored in the data storage unit; and
    a display unit configured to display a process or a result of the processing of the controller,
    wherein the is configured to rearrange the tooth data along a second arch line different from a pre-stored first arch line,
    wherein the controller is configured to move a target tooth, which is to be moved, among the tooth data in at least one direction of a buccal direction or a mesial direction determined from the tooth data, and
    wherein:
    a first buccal direction of the target tooth toward a first arch line is identical to a second buccal direction of the target tooth toward the second arch line, or
    a first mesial direction of the target tooth toward the first arch line is identical to a second mesial direction of the target tooth toward the second arch line.

12. The data processing device of claim 11, wherein the controller comprises:

an arch line generator configured to generate the second arch line;

a virtual figure generator configured to generate at least one virtual line connecting the target tooth to the second arch line in order to rearrange the tooth data on the second arch line;

a distance calculator configured to determine a shortest distance between the target tooth and the second arch line by the at least one virtual line; and a data adjustment unit configured to move the target tooth toward the second arch line.

13. The data processing device of claim 12, wherein the virtual figure generator is configured to:

generate a virtual circle by using the target tooth and at least one adjacent tooth adjacent to the target tooth; and generate at least one buccal virtual line parallel to the central virtual line including a central virtual line connecting a center of the circle to a center point of the target tooth.

14. The data processing device of claim 13, wherein the distance calculator is configured to determine a virtual line, which has a shortest distance between a contour of the target tooth and the second arch line, from the central virtual line and the at least one buccal virtual line parallel to the central virtual line, and wherein the data adjustment unit is configured to parallelly move the target tooth in the buccal direction along the determined virtual line.

15. The data processing device of claim 14, wherein the data adjustment unit is configured to parallelly move the target tooth in the mesial direction perpendicular to the buccal direction, and wherein the parallel movement in the buccal direction is sequentially performed with the parallel movement in the mesial direction.

16. The data processing device of claim 12, wherein the first arch line comprises at least one of an arch line center point formed between central teeth, and at least two movement points formed at both sides of the arch line center point, wherein the second arch line is generated by at least one of parallel movement of the first arch line by the arch line center point or shape deformation by the movement point, and wherein the arch line generator is configured to generate a curve, which is finally generated as the second arch line, by parallel movement of the arch line center point or shape deformation by the movement point.

17. The data processing device of claim 16, wherein the shape deformation is at least one of a width change of the first arch line according to movement of the movement point on a plane and a smile line change of the first arch line according to movement of the movement point in a normal direction of the plane.

* * * * *